United States Patent
Egawa et al.

(10) Patent No.: US 6,835,698 B2
(45) Date of Patent: Dec. 28, 2004

(54) ETHYLENE-BASE COPOLYMERS, PROCESS FOR PRODUCING THE SAME AND LUBRICATING OIL COMPOSITIONS CONTAINING THE SAME

(75) Inventors: Tatsuya Egawa, Chiba (JP); Yutaka Minami, Chiba (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 10/169,736

(22) PCT Filed: Feb. 8, 2001

(86) PCT No.: PCT/JP01/00883

§ 371 (c)(1),
(2), (4) Date: Jul. 16, 2002

(87) PCT Pub. No.: WO01/58968

PCT Pub. Date: Aug. 16, 2001

(65) Prior Publication Data

US 2003/0087773 A1 May 8, 2003

(30) Foreign Application Priority Data

Feb. 9, 2000 (JP) .................................. 2000-031589

(51) Int. Cl.$^7$ .................. C01M 107/02; C01M 143/02; C08F 10/00
(52) U.S. Cl. ........................... 508/591; 585/12; 526/72
(58) Field of Search ..................... 508/591; 585/511, 585/512, 513

(56) References Cited

U.S. PATENT DOCUMENTS

| 5,446,221 | A | * | 8/1995 | Struglinski | 585/10 |
| 6,063,880 | A | * | 5/2000 | Winter et al. | 526/160 |
| 6,261,474 | B1 | | 7/2001 | Egawa et al. | 252/68 |
| 6,339,135 | B1 | * | 1/2002 | Kashiwamura et al. | 526/160 |
| 6,414,090 | B2 | | 7/2002 | Minami et al. | 525/338 |
| 6,583,239 | B2 | * | 6/2003 | Minami et al. | 526/127 |
| 6,589,920 | B2 | * | 7/2003 | Okada et al. | 508/591 |

FOREIGN PATENT DOCUMENTS

| EP | 129414 | 12/1984 |
| EP | 422859 | 4/1991 |
| EP | 721954 | 7/1996 |
| EP | 818458 | 1/1998 |
| JP | 2000-72825 | 3/2000 |
| JP | 2000-351813 | 12/2000 |

* cited by examiner

*Primary Examiner*—Ellen M. McAvoy
(74) *Attorney, Agent, or Firm*—Oblon, Spivak, McClelland, Maier & Neustadt, P.C.

(57) ABSTRACT

There are disclosed an ethylenic copolymer comprising ethylene and an α-olefin in which diad chain distribution [EA] of ethylene [E] and α-olefin [A] as determined by the nuclear magnetic resonance spectrum method ($^{13}$C-NMR method) and ethylene content α (mol %) as determined by nuclear magnetic resonance spectrum satisfy the following relational expressions (1) and (2):

$$0.7-2.8(0.5-\alpha/100)^2-|0.25(0.5-\alpha/100)| \leq [EA] \leq 2\alpha/100 \quad (1)$$

(| | represents the absolute value)

$$10 \leq \alpha \leq 90 \quad (2)$$

and in which the α-olefin has 3 to 20 carbon atoms; a process for producing the ethylenic copolymer and a lubricating oil composition comprising the same. Specifically the present invention provides the ethylenic copolymer which is imparted simultaneously with a high viscosity index and low pour point and accordingly, and is usable as a useful lubricating oil composition, when used alone as base oil for a lubricating oil, or as a viscosity index improver for another base oil; the process for producing the ethylenic copolymer; and the lubricating oil composition comprising the same.

15 Claims, No Drawings

ETHYLENE-BASE COPOLYMERS, PROCESS FOR PRODUCING THE SAME AND LUBRICATING OIL COMPOSITIONS CONTAINING THE SAME

TECHNICAL FIELD

The present invention relates to an ethylenic copolymer, a process for producing the same and a lubricating oil composition comprising the same. More particularly, it is concerned with an ethylenic copolymer which is useful as a lubricating oil base oil having a high viscosity index and a low pour point also as a viscosity index improver, a process for producing the ethylenic copolymer and a lubricating oil composition comprising the same.

BACKGROUND ART

Oils (lubricating oils) are used for preventing friction of each of part items in engines for automobiles and the like and in industrial gears. The lubricating oils are required to be usable at a wide range of temperature, in particular at a low temperature in cold districts. Such being the case, lubricating oils are required to have such performances as a high viscosity index and a low pour point. In order to meet the requirement, there are developed base oils as components of lubricating oils and viscosity index improvers.

In general, however, viscosity index and pour point are each a conflicting property, and therefore it has been difficult to reconcile a high viscosity index and a low pour point. As a countermeasure, there is proposed a synthetic oil such as poly α-olefin and ethylene-α-olefin copolymer. Nevertheless, their performances are still insufficient.

For instance, there is disclosed a liquid ethylene base random copolymer having specific properties in Japanese Patent Publication No.821/1994 (Heisei 6), which however has not been satisfactory regarding viscosity index or pour point.

DISCLOSURE OF THE INVENTION

In such circumstances, an object of the present invention is to solve the above-mentioned problems and thus provide an ethylenic copolymer which is useful as a base stock for lubricating oil having a high viscosity index and a low pour point also as a viscosity index improver, a process for producing the ethylenic copolymer and a lubricating oil composition comprising the same.

As a result of intensive investigation accumulated by the present inventors in order to achieve the aforesaid object, it has been found that it is made possible to solve the foregoing problems by using an ethylenic copolymer in which diad chain distribution of ethylene and α-olefin as determined by the nuclear magnetic resonance spectrum method ($^{13}$C-NMR method) satisfies a specific relationship, which has an ethylene content within a specific range, and in which the α-olefin has the number of carbon atoms within a specific range. The present invention has been accomplished by the aforesaid findings and information.

That is to say, the present invention provides an ethylenic copolymer, a process for producing the same and a lubricating oil composition comprising the same, each being described hereunder.

{1} An ethylenic copolymer comprising ethylene and an α-olefin in which diad chain distribution [EA] of ethylene [E] and α-olefin [A] as determined by the nuclear magnetic resonance spectrum method ($^{13}$C-NMR method) and ethylene content α (mol %) as determined by nuclear magnetic resonance spectrum satisfy the following relational expressions (1) and (2):

$$0.7-2.8(0.5-\alpha/100)^2-|0.25(0.5-\alpha/100)| \leq [EA] \leq 2\alpha/100 \quad (1)$$

(| | represents the absolute value)

$$10 \leq \alpha \leq 90 \quad (2)$$

and in which the α-olefin has 3 to 20 carbon atoms.

{2} The ethylenic copolymer as set forth in item {1}, wherein the ethylene content a satisfies the following relational expression (3):

$$10 \leq \alpha \leq 43 \quad (3)$$

{3} The ethylenic copolymer as set forth in item {1}, which has a kinematic viscosity at 100° C. of 3 to 2000 (mm$^2$/sec).

{4} The ethylenic copolymer as set forth in item {1}, which has a number average molecular weight (Mn) being $10000 < Mn \leq 200000$ and the ratio of weight average molecular weight (Mw) to number average molecular weight (Mn) [Mw/Mn] being $1 < Mw/Mn \leq 5$.

{5} A process for producing the ethylenic copolymer as set forth in any of the items {1} to {4} by copolymerizing ethylene and the α-olefin in the presence of a catalyst for producing an ethylenic copolymer which comprises (A) at least one transition metal compound represented by the following general formula (I) or (II) and (B) at least one species selected from (a) organoaluminum oxy-compounds and (b) ionic compounds convertible into cations by reacting with the above-mentioned transition metal compound:

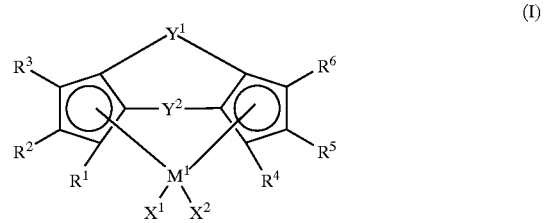

(I)

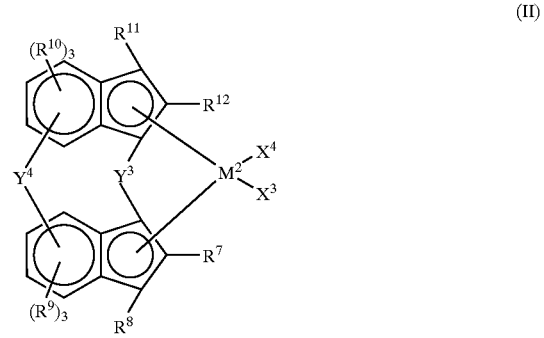

(II)

wherein R$^1$ to R$^{12}$ and X$^1$ to X$^4$ are each independently of one another a hydrogen atom, a halogen atom, a hydrocarbon group having 1 to 20 carbon atoms, a halogen-containing hydrocarbon group having 1 to 20 carbon atoms, a silicon-containing group, an oxygen-containing group, a sulfur-containing group, a nitrogen-containing group or a phosphorus-containing group; adjacent groups may be bonded to each other to form a ring; R$^9$ and R$^{10}$ may be the same as or different from each other; Y$^1$ to Y$^4$ are each independently of each other a bivalent group bonding two ligands, and denote a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, NR$^{13}$—, PR$^{13}$—, —P(O)R$^{13}$—, —BR$^{13}$—, or —AlR$^{13}$—, wherein R$^{13}$ is hydrogen atom, a halogen atom, a hydrocarbon group having 1 to 20 carbon atoms, a halogen-containing hydrocarbon group having 1 to 20 carbon atoms; and M$^1$ and M$^2$ are each a transition metal belonging to any of the group IVA, VA and VIA of the Periodic Table.

{6} A lubricating oil composition which comprises the ethylenic copolymer as set forth in any of the preceding items {1} to {4}.

{7} A lubricating oil composition wherein the ethylenic copolymer as set forth in any of the preceding items {1} to {4} is contained for use as a base oil.

{8} A lubricating oil composition wherein the ethylenic copolymer as set forth in any of the preceding items {1} to {4} is contained for use as a viscosity index improver.

THE MOST PREFERRED EMBODIMENT TO CARRY OUT THE INVENTION

In the following, the present invention will be described in more detail.

1. Ethylenic Copolymer

In the aforesaid ethylenic copolymer {1} to {4} according to the present invention, diad chain distribution [EA] of ethylene [E] and α-olefin [A] as determined by the nuclear magnetic resonance spectrum method ($^{13}$C-NMR method) and ethylene content α (mol %) as determined by nuclear magnetic resonance spectrum satisfy the following relational expression (1):

$$0.7-2.8(0.5-\alpha/100)^2-|0.25(0.5-\alpha/100)| \leq [EA] \leq 2\alpha/100 \quad (1)$$

(| | represents the absolute value)

In the aforesaid ethylenic copolymer {1} to {4} according to the present invention, the ethylene content α (mol %) is $10 \leq \alpha \leq 90$, preferably $10 \leq \alpha \leq 80$, more preferably $10 \leq \alpha \leq 70$, most preferably $20 \leq \alpha \leq 43$. The ethylene content α, when being less than 10 mol %, brings about lowered viscosity index, whereas the α, when being more than 90 mol %, leads to rise in pour point.

In the aforesaid ethylenic copolymer {1} to {4} according to the present invention, the α-olefin has 3 to 20, preferably 3 to 14, more preferably 3 to 12 carbon atoms. The number of carbon atoms, when being more than 20, brings about rise in pour point, whereas the number thereof, when being less than 3, causes waxy product and also rise in pour point. In the above-mentioned case, the α-olefin may comprise plural species.

In the aforesaid ethylenic copolymer {3} according to the present invention the ethylenic copolymer has a kinematic viscosity at 100° C. of 3 to 2000 (mm$^2$/sec), preferably 4 to 1000 (mm$^2$/sec), more preferably 10 to 1000 (mm$^2$/sec), most preferably 40 to 1000 (mm$^2$/sec). The kinematic viscosity thereof, when being less than 3 (mm$^2$/sec), gives rise to insufficient lubricity and much loss on vaporization, whereas the kinematic viscosity, when being more than 2000 (mm$^2$/sec), brings about an increase in friction loss. In addition, an ethylenic copolymer suitable for industrial gear oil has a kinematic viscosity at 100° C. of 40 to 1000 (mm$^2$/sec), and that suitable for engine oil has a kinematic viscosity at 100° C. of 4 to 10 (mm$^2$/sec).

In the aforesaid ethylenic copolymer {4} according to the present invention, the ethylenic copolymer has a number average molecular weight (Mn) as determined by gel permeation chromatography being $10000 < Mn \leq 200000$, preferably $10000 < Mn \leq 150000$, more preferably $10000 < Mn \leq 100000$. The number average molecular weight (Mn), when being less than 10000, results in less working effect on enhancement of viscosity index, whereas Mn, when being more than 200000, gives rise to deterioration in shear stability and lowered viscosity.

In addition, the ratio of the weight average molecular weight (Mw) to the number average molecular weight (Mn) [Mw/Mn] is $1 < Mw/Mn \leq 5$, preferably $1 < Mw/Mn \leq 3$. When the molecular weight distribution expressed in terms of Mw/Mn is unreasonably wide, light fractions are unfavorably increased, thereby causing deterioration in vaporization characteristics particularly in a low molecular-weight (kinematic viscosity) region, while in a high molecular-weight region, fluidity of oil is deteriorated.

2. Process for Producing Ethylenic Copolymer

A process for producing ethylenic copolymer according to the present invention (ethylenic copolymer in the foregoing items {1} to {4}) is a process wherein ethylene and an α-olefin are copolymerized in the presence of a metallocene catalyst, that is, a process in which ethylene and an α-olefin are copolymerized in the presence of a catalyst which comprises (A) a compound of a transition metal belonging to any of the group IVA, VA and VIA of the Periodic Table, (B) at least one species selected from (a) organoaluminum oxy-compounds and (b) ionic compounds convertible into cations by reacting with the above-mentioned compound of a transition metal, and further at need (C) an organometal compound.

The above-mentioned (A) a compound of a transition metal belonging to any of the group IVA, VA and VIA of the Periodic Table is a transition metal compound which has a ligand containing two cycloalkadienyl skeletons crosslinked with at least one crosslinking group, and is represented by the following general formula (I) or (II). Therein the crosslinking group is preferably an alkylene group, and the transition metal compound is preferably that of meso form or C$_1$ symmetry.

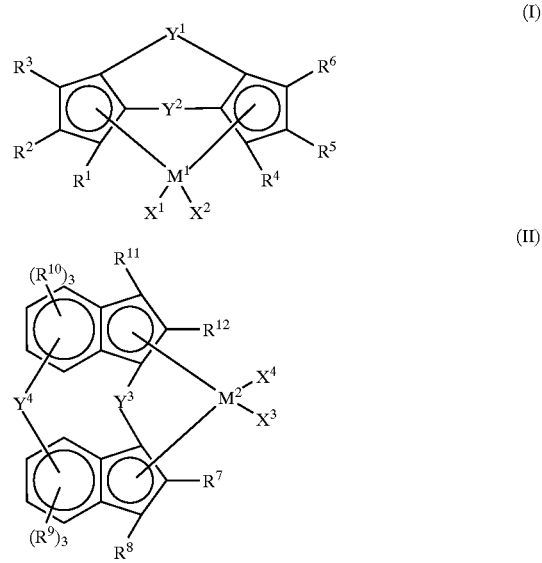

wherein R$^1$ to R$^{12}$ and X$^1$ to X$^4$ are each independently of one another hydrogen atom, a halogen atom, a hydrocarbon group having 1 to 20 carbon atoms, a halogen-containing hydrocarbon group having 1 to 20 carbon atoms, a silicon-containing group, an oxygen-containing group, a sulfur-containing group, a nitrogen-containing group or a phosphorus-containing group; adjacent groups may be bonded to each other to form a ring; $R^9$ and $R^{10}$ may be the same as or different from each other; $Y^1$ to $Y^4$ are each independently of each other a bivalent group bonding two ligands, and denote a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, NR$^{13}$—, PR$^{13}$—, —P(O)R$^{13}$—, —BR$^{13}$—, or —AlR$^{13}$—, wherein $R^{13}$ is hydrogen atom, a halogen atom, a hydrocarbon group having 1 to 20 carbon atoms, a halogen-containing hydrocarbon group having 1 to 20 carbon atoms; and $M^1$ and $M^2$ are each a transition metal belonging to any of the group IVA, VA and VIA of the Periodic Table.

The above-mentioned compound represented by the general formula (I) is specifically exemplified by a compound of a transition metal belonging to any of the group IVA, VA and VIA of the Periodic Table, said compound of a transition metal being represented by the general formula (I)A or (I)B:

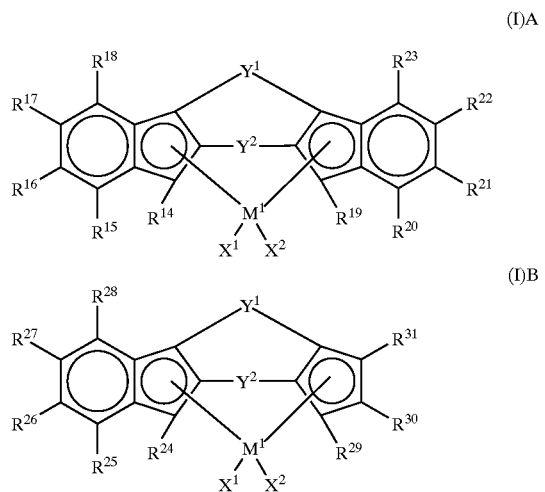

wherein $R^{14}$ to $R^{31}$ and $X^1$, $X^2$ are each independently of one another hydrogen atom, a halogen atom, a hydrocarbon group having 1 to 20 carbon atoms, a halogen-containing hydrocarbon group having 1 to 20 carbon atoms, a silicon-containing group, an oxygen-containing group, a sulfur-containing group, a nitrogen-containing group or a phosphorus-containing group; adjacent groups may be bonded to each other to form a ring; $Y^1$, $Y^2$ are each independently of each other a bivalent group bonding two ligands, and denote a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, NR$^{32}$—, PR$^{32}$—, —P(O)R$^{32}$—, —BR$^{32}$—, or —AlR$^{32}$—, wherein $R^{32}$ is hydrogen atom, a halogen atom, a hydrocarbon group having 1 to 20 carbon atoms, a halogen-containing hydrocarbon group having 1 to 20 carbon atoms; and $M^1$ is a transition metal belonging to any of the group IVA, VA and VIA of the Periodic Table.

Examples of the above-mentioned compounds represented by the general formula (I)A include dichlorides such as (1,1'-ethylene) (2,2'-ethylene)bisindenyl zirconium dichloride; (1,1'-ethylene) (2,2'-ethylene)bis(3-methylindenyl)zirconium dichloride; (1,1'-ethylene)( 2,2'-ethylene)bis(4-methylindenyl)zirconium dichloride; (1,1'-ethylene)(2,2'-ethylene)bis (5-methylindenyl)zirconium dichloride; (1,1'-ethylene) (2,2'-ethylene)bis(5,6-benzoindenyl)zirconium dichloride; (1,1'-ethylene)(2,2'-ethylene)bis(4,5-benzoindenyl)zirconium dichloride; (1,1'-ethylene)(2,2'-ethylene)bis(5,6-dimethylindenyl)zirconium dichloride; (1,1'-dimethylsilylene) (2,2'-dimethylsilylene) bisindenyl zirconium dichloride; (1,1'-dimethylsilylene)(2, 2'-dimethylsilylene)bis(3-methylindenyl)zirconium dichloride; (1,1'-dimethylsilylene)(2,2'-dimethylsilylene)bis(4-methylindenyl)zirconium dichloride; (1,1'-dimethylsilylene) (2,2'-dimethylsilylene)bis(5-methylindenyl)zirconium dichloride; (1,1'-dimethylsilylene)(2,2'-dimethylsilylene)bis (5,6-benzoindenyl)zirconium dichloride; (1,1'-dimethylsilylene)(2,2'-dimethylsilylene)bis(4,5-benzoindenyl)zirconium dichloride; (1,1'-dimethylsilylene) (2,2'-dimethylsilylene)bis(5,6-dimethylindenyl)zirconium dichloride; (1,1'-dimethylsilylene)(2,2'-ethylene)bisindenyl zirconium dichloride; (1,1'-dimethylsilylene)(2,2'-ethylene) bis(3-methylindenyl)zirconium dichloride; (1,1'-dimethylsilylene)(2,2'-ethylene)bis(4-methylindenyl) zirconium dichloride; (1,1'-dimethylsilylene)(2,2'-ethylene) bis(5-methylindenyl)zirconium dichloride; (1,1'-dimethylsilylene)(2,2'-ethylene)bis(5,6-benzoindenyl) zirconium dichloride; (1,1'-dimethylsilylene)(2,2'-ethylene) bis(4,5-benzoindenyl)zirconium dichloride; (1,1'-dimethylsilylene)(2,2'-ethylene)bis(5,6-dimethylindenyl) zirconium dichloride; (1,1'-ethylene)(2,2'-dimethylsilylene) bisindenyl zirconium dichloride; (1,1'-ethylene)(2,2'-dimethylsilylene)bis(3-methylindenyl)zirconium dichloride; (1,1'-ethylene)(2,2'-dimethylsilylene)bis(4-methylndenyl)zirconium dichloride; (1,1'-ethylene)(2,2'-dimethylsilylene)bis(5-methylndenyl)zirconium dichloride; (1,1'-ethylene)(2,2'-dimethylsilylene)bis(5,6-benzoindenyl) zirconium dichloride; (1,1'-ethylene)(2,2'-dimethylsilylene) bis(4,5-benzoindenyl)zirconium dichloride; (1,1'-ethylene) (2,2'-dimethylsilylene)bis(5,6-dimethylindenyl)zirconium dichloride; (1,1'-dimethylsilylene)(2,2'-isopropylidene)bis (4,5-benzoindenyl)zirconium dichloride; (1,1'-dimethylsilylene)(2, 2'-isopropylidene)bis(5,6-benzoindenyl)zirconium dichloride; (1,1'-isopropylidene)(2, 2'-dimethylsilylene)bis(4,5-benzoindenyl)zirconium dichloride; and (1,1'-isopropylidene)-(2,2'-dimethylsilylene) bis(5,6-benzoindenyl)zirconium dichloride; dimethyl compounds, diethyl compounds, dihydro compounds, diphenyl compounds and dibenzyl compounds each of the above-exemplified dichloride, titanium complexes thereof and hafnium complexes thereof.

Examples of the aforesaid compounds represented by the general formula (I)B include dichlorides such as (1,1'-ethylene)(2,2'-ethylene)indenyl(3,5-dimethylcyclopentadienyl)zirconium dichloride; (1,1'-ethylene)(2,2'-ethylene)-indenyl(3,4-dimethylcyclopentadienyl)zirconium dichloride; (1,1'-ethylene)(2,2'-ethylene)indenyl(3-methylcyclopentadienyl) zirconium dichloride; (1,1-ethylene)(2,2'-ethylene)(4-methylindenyl)(3,5-dimethylcyclopentadienyl)zirconium dichloride; (1,1'-ethylene)(2,2'-ethylene)(4-methylindenyl)-(3-methylcyclopentadienyl)zirconium dichloride; (1,1'-ethylene)(2,2'-ethylene)(5-methylindenyl)(3,5-dimethylcyclopentadienyl)zirconium dichloride; and (1,1'-ethylene)(2,2'-ethylene) (5-methylindenyl)(3-methylcyclopentadienyl)zirconium dichloride, dimethyl compounds, diethyl compounds, dihydro compounds, diphenyl compounds and dibenzyl compounds each of the above-exemplified compounds of a transition metal belonging to the group IV of the Periodic Table.

Examples of the compounds represented by the general formula (II) include a compound of a transition metal belonging to any of the group IVA, VA and VIA of the Periodic Table, said compound of a transition metal being represented by the general formula (II)A or (II)B:

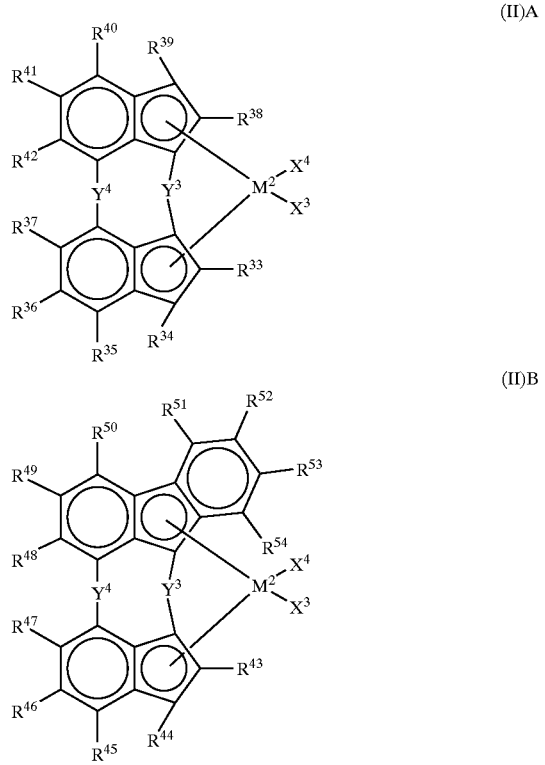

wherein $R^{33}$ to $R^{54}$ and $X^3$, $X^4$ are each independently of one another hydrogen atom, a halogen atom, a hydrocarbon group having 1 to 20 carbon atoms, a halogen-containing hydrocarbon group having 1 to 20 carbon atoms, a silicon-containing group, an oxygen-containing group, a sulfur-containing group, a nitrogen-containing group or a phosphorus-containing group; adjacent groups may be bonded to each other to form a ring; $Y^3$, $Y^4$ are each independently of each other a bivalent group bonding two ligands, and denote a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, NR$^{55}$—, PR$^{55}$—, —P(O)R$^{55}$—, —BR$^{55}$—, or —AlR$^{55}$—, wherein R$^{55}$ is hydrogen atom, a halogen atom, a hydrocarbon group having 1 to 20 carbon atoms, a halogen-containing hydrocarbon group having 1 to 20 carbon atoms; and $M^2$ is a transition metal belonging to any of the group IVA, VA and VIA of the Periodic Table.

Examples of the compounds represented by the foregoing general formula (II)A include dichlorides such as (1,1'-ethylene) (7,7'-ethylene)bisindenyl zirconium dichloride; (1,1'-ethylene)(7,7'-ethylene)bis(2-methylindenyl) zirconium dichloride; (1,1'-ethylene)(7,7'-ethylene)bis(3-methylindenyl)zirconium dichloride; (1,1'-dimethylsilylene) (7,7'-dimethylsilylene)bisindenyl zirconium dichloride; (1,1'-dimethylsilylene)(7,7'-dimethylsilylene)bis(2-methylindenyl)zirconium dichloride; (1,1'-dimethylsilylene) (7,7'-dimethylsilylene)bis(3-methylindenyl)zirconium dichloride; (1,1'-ethylene)(7,7'-dimethylsilylene)bisindenyl zirconium dichloride; (1,1'-ethylene) (7,7'-dimethylsilylene) bis(2-methylindenyl)zirconium dichloride; (1,1'-ethylene) (7,7'-dimethylsilylene)bis(3-methylindenyl)zirconium dichloride; (1,1'-dimethylsilylene)(7,7'-ethylene)bisindenyl zirconium dichloride; (1,1'-dimethylsilylene)(7,7'-ethylene) bis(2-methylindenyl)zirconium dichloride; and (1,1'-dimethylsilylene)(7,7'-ethylene)bis(3-methylindenyl) zirconium dichloride, and dimethyl compounds, diethyl compounds, dihydro compounds, diphenyl compounds and dibenzyl compounds each of the above-exemplified dichlorides containing a transition metal belonging to the group IV.

Examples of the compounds represented by the foregoing general formula (II)B include dichlorides such as (1,9'-ethylene) (7,1'-ethylene)(indenyl)(fluorenyl)zirconium dichloride; (1,9'-ethylene) (7,1'-ethylene)(2-methylindenyl) (fluorenyl)zirconium dichloride; (1,9'-ethylene)(7,1'-ethylene)(3-methylindenyl)(fluorenyl)zirconium dichloride; (1,9'-ethylene) (7,1'-ethylene)(6-methylindenyl)(fluorenyl) zirconium dichloride; (1,9'-ethylene)(7,1'-ethylene) (indenyl)(8-methylfluorenyl)zirconium dichloride; (1,9'-ethylene) (7,1'-ethylene)(indenyl)(7-methylfluorenyl) zirconium dichloride; (1,9'-dimethylsilylene)(7,1'-ethylene) (indenyl)(fluorenyl)-zirconium dichloride; (1,9'-dimethylsilylene)(7,1'-ethylene)(2-methylindenyl) (fluorenyl)zirconium dichloride; (1,9'-dimethylsilylene)(7, 1'-ethylene)(3-methylindenyl)(fluorenyl)zirconium dichloride; (1,9'-dimethylsilylene)(7,1'-ethylene)(6-methylindenyl)(fluorenyl)zirconium dichloride; (1,9'-dimethylsilylene)(7,1'-ethylene)(indenyl)(8-methylfluorenyl)zirconium dichloride; (1,9'-dimethylsilylene)(7,1'-ethylene)(indenyl)(7-methylfluorenyl)zirconium dichloride; (1,9'-ethylene)(7,1'-dimethylsilylene)(indenyl)(fluorenyl)zirconium dichloride; (1,9'-ethylene)(7,1'-dimethylsilylene)(2-methylindenyl) (fluorenyl)zirconium dichloride; (1,9'-ethylene)(7,1'-dimethylsilylene)(3-methylindenyl)(fluorenyl)zirconium dichloride; (1,9'-ethylene)(7,1'-dimethyl-silylene)(6-methylindenyl)(fluorenyl)zirconium dichloride; (1,9'-ethylene)(7,1'-dimethylsilylene)(indenyl)(8-methylfluorenyl)zirconium dichloride; (1,9'-ethylene) (7,1'-dimethylsilylene)(indenyl)(7-methylfluorenyl)zirconium dichloride; (1,9'-dimethylsilylene)(7,1'-dimethylsilylene) (indenyl)(fluorenyl)zirconium dichloride; (1,9'-dimethylsilylene)(7,1'-dimethylsilylene)(2-methylindenyl) (fluorenyl)zirconium dichloride; (1,9'-dimethylsilylene)(7, 1'-dimethylsilylene)(3-methylindenyl)(fluorenyl)zirconium dichloride; (1,9'-dimethylsilylene)(7,1'-dimethylsilylene)(6-methylindenyl)(fluorenyl)zirconium dichloride; (1,9'-dimethylsilylene)(7,1'-dimethylsilylene)(indenyl)(8-methylfluorenyl)zirconium dichloride; (1,9'-dimethylsilylene)(7,1'-dimethylsilylene)(indenyl)(7-methylfluorenyl)zirconium dichloride, and dimethyl compounds, diethyl compounds, dihydro compounds, diphenyl compounds and dibenzyl compounds each of the above-exemplified compounds of a transition metal belonging to the group IV of the Periodic Table.

Any of the transition metal compounds to be employed as the component (A) may be used alone or in combination with at least one other.

The organoaluminum oxy-compound (a) to be employed as the component (B) in the present invention is exemplified by a chain aluminoxane represented by the following general formula (III)

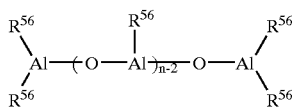
(III)

wherein $R^{56}$ is a hydrocarbon group such as an alkyl group having 1 to 20, preferably 1 to 12 carbon atoms, an alkenyl group, an aryl group or an arylalkyl group or a halogen atom and may be the same as or different from one another, n is degree of polymerization and is an integer in the range of usually 2 to 50, preferably 2 to 40, and cyclic aluminoxanes represented by the following general formula (IV):

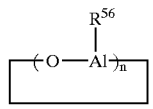
(IV)

wherein $R^{56}$ and n are each as previously defined. A process for producing the above-mentioned aluminoxane is exemplified by a process in which an alkylaluminum and a condensation agent such as water are brought into contact with each other. The method of contacting is not specifically limited, but may be selected for use from well known methods such as a ① method in which an organoaluminum compound is dissolved in organic solvent in advance, and water is brought into contact with the resultant solution, ② method in which an organoaluminum compound is added at the time of starting the polymerization, and thereafter water is added thereto, ③ method in which an organoaluminum compound is reacted with crystal water contained in a metal salt or the like or with water adsorbed onto an inorganic or organic compound, ④ method in which a tetraalkyl dialuminoxane is reacted with a trialkylaluminum, and water is reacted with the reactant, and the like methods. The aluminoxane may be insoluble in toluene, and may be used alone or in combination with at least one other. On the other hand, as the component (b), there is usable any of ionic compounds provided that it can be converted into a cation by reacting with the above-mentioned transition metal compound (A), particularly the compounds represented by the following general formula (V) or (VI):

(V)

(VI)

in which $L^2$ is $M^5$, $R^{58}R^{59}M^6$, $R^{60}{}_3C$ or $R^{61}M^6$; $L^1$ is a Lewis base; $[Z]^-$ is an non-coordinate anion, that is, $[Z^1]^-$ or $[Z^2]^-$, wherein $[Z^1]^-$ is an anion to which a plurality of groups are bonded to elements, that is, $[M^7G^1G^2 \ldots G^1]^-$ ($M^7$ is an element belonging to any of the groups 5 to 15, preferably 13 to 15 of the Periodic Table, $G^1$ to $G^1$ are each hydrogen atom, a halogen atom, an alkyl group having 1 to 20 carbon atoms, a dialkylamino group having 2 to 40 carbon atoms, an alkoxy group having 1 to 20 carbon atoms, an aryl group having 6 to 20 carbon atoms, an aryloxy group having 6 to 20 carbon atoms, an alkylaryl group having 7 to 40 carbon atoms, an arylalkyl group having 7 to 40 carbon atoms, a halogen-substituted hydrocarbon group having 1 to 20 carbon atoms, an acyloxy group having 1 to 20 carbon atoms, an organometalloid group or a heteroatom-containing group having 2 to 20 carbon atoms, among $G^1$ to $G^1$, two or more G may form a ring, and f is an integer denoting [(valency of $M^7$ as the central metal)+1]); $[Z^2]^-$ is a single Brønsted acid having a logarithm of inverse number of acid dissociation constant being minus 10 or less or a conjugate base of the combination of a Brønsted acid and a Lewis acid or a conjugate base of an acid generally defined as a super-strong acid, wherein a Lewis base may be coordinated, $R^{57}$ is hydrogen atom, an alkyl group having 1 to 20 carbon atoms, or an aryl group, an alkylaryl group or an arylalkyl group each having 6 to 20 carbon atoms; $R^{58}$ and $R^{59}$ are each cyclopentadienyl group, a substituted cyclopentadienyl group, an indenyl group or a fluorenyl group; $R^{60}$ is an alkyl group having 1 to 20 carbon atoms, an aryl group, an alkylaryl group or an arylalkyl group; $R^{61}$ is a macrocyclic ligand such as tetraphenylporphyrin or phthalocyanine; k is an ionic valency of $[L^1—R^{57}]$, $[L^2]$ and an integer of from 1 to 3, a is an integer of 1 or greater, b is (k×a); $M^6$ is an element belonging to any of groups 1 to 3, 11 to 13 and 17 of the Periodic Table; and $M^6$ is an element belonging to any of groups 7 to 12 of the Periodic Table.

Specific examples of $L^1$ include amine series such as ammonia, methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline and p-nitro-dimethylaniline; phosphines such as triethylphosphine, triphenylphosphine and diphenylphosphine; thioethers such as tetrahydrothiophene; esters such as ethyl benzoate; and nitriles such as acetonitrile and benzonitrile.

Specific examples of $R^{57}$ include hydrogen, methyl group, ethyl group, benzyl group and trityl group. Specific examples of $R^{58}$ and $R^{59}$ include a cyclopentadienyl group, a methylcyclopentadienyl group, an ethylcyclopentadienyl and a pentamethylcyclopentadienyl group. Specific examples of $R^{60}$ include a phenyl group, a p-tolyl group and p-methoxyphenyl group. Specific examples of $R^{61}$ include tetraphenylporphyrin, phthalocyanine, an allyl group and a methallyl group. Specific examples of $M^5$ include Li, Na, K, Ag, Cu, Br, I and $I_3$. Specific examples of $M^6$ include Mn, Fe, Co, Ni and Zn.

In addition, Specific examples of $M^7$ in $[Z^1]^-$, that is, $[M^7G^1G^2 \ldots G^1]^-$ include B, Al, Si, P, As and Sb, preferably B and Al. Specific examples of $G^1G^2 \ldots G^1$ include dialkylamino groups such as dimethylamino group and diethylamino group; alkoxy or aryloxy groups such as methoxy group, ethoxy group, n-butoxy group and phenoxy group; hydrocarbon groups such as methyl group, ethyl group, n-propyl group, isopropyl group, n-butyl group, isobutyl group, n-octyl group, n-eicosyl group, phenyl group, p-tolyl group, benzyl group, 4-t-butylphenyl group and 3,5-dimethylphenyl group; halogen atoms such as fluorine, chlorine, bromine and iodine; heteroatom-containing hydrocarbon groups such as p-fluorophenyl group, 3,5-difluorophenyl group, pentachlorophenyl group, 3,4,5-trifluorophenyl group, pentafluorophenyl group, 3,5-bis(trifluoromethyl)phenyl group and bis(trimethylsilyl) methyl group; and organometalloid groups such as pentamethylantimony group, trimethylsilyl group, trimethylgermyl group, diphenylarsine group,dicyclohexylantimony group and diphenylboron group.

Specific examples of the $[Z^2]^-$ which is a single Brønsted acid having a pKa value of minus 10 or less or a conjugate base of the combination of a Brønsted acid and a Lewis acid include trifluoromethanesulfonic acid anion $(CF_3SO_3)^-$, bis (trifluoromethanesulfonyl)methyl anion, bis (trifluoromethanesulfonyl)benzyl anion, bis (trifluoromethanesulfonyl)amide anion, perchloric acid anion $(ClO_4)^-$, trifluoroacetic acid anion $(CF_3COO)^-$, hexafluoroantimony anion (SbF$_6$)⁻, fluorosulfonic acid anion (FSO$_3$) −, chlorosulfonic acid anion (ClSO$_3$)⁻, fluorosulfonic acid anion/5-fluoroantimony (FSO$_3$/SbF$_5$)⁻, fluorosulfonic acid anion/5-fluoroarsenic (FSO$_3$/AsF$_5$)⁻, trifluoromethanesulfonic acid/5-fluoroantimony (CF$_3$SO$_3$/SbF$_5$), etc.

Specific examples of the above-mentioned component (b) include triethylammonium tetraphenylborate, tri-n-butylammonium tetraphenylborate, trimethylammonium tetraphenylborate, methyl(tri-n-butyl)ammonium tetraphenylborate, benzyl(tri-n-butyl)ammonium tetraphenylborate, dimethyldiphenylammonium tetraphenylborate, triphenyl(methyl)ammonium tetraphenylborate, trimethylanilinium tetraphenylborate, methylpyridinium tetraphenylborate, benzylpyridinium tetraphenylborate, methyl(2-cyanopyridinium) tetraphenylborate, triethylammonium tetrakis(pentafluorophenyl) borate, tri-n-butylammonium tetrakis(pentafluorophenyl)borate, triphenylammonium tetrakis(pentafluorophenyl)borate, tetra-n-butylammonium tetrakis(pentafluorophenyl)borate, tetraethylammonium tetrakis(pentafluorophenyl)borate, benzyl(tri=n-butyl)ammonium tetrakis(pentafluorophenyl)borate, methyldiphenylammonium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium) tetrakis(pentafluorophenyl)borate, benzyl(2-cyanopyridinium) tetrakis(pentafluorophenyl)borate, methyl(4-cyanopyridinium) tetrakis(pentafluorophenyl) borate, triphenylphosphonium tetrakis(pentafluorophenyl)borate, dimethylanilinium tetrakis[bis(3,5-ditrifluoromethyl)phenyl] borate, ferrocenium tetraphenylborate, silver tetraphenylborate, trityl tetraphenylborate, tetraphenylporphinemanganese tetraphenylborate, ferrocenium tetrakis (pentafluorophenyl)borate, (1,1-dimethylferrocenium) tetrakis(pentafluorophenyl)borate, decamethylferrocenium tetrakis(pentafluorophenyl)borate, silver tetrakis(pentafluorophenyl)borate, trityl tetrakis(pentafluorophenyl)borate, lithium tetrakis(pentafluorophenyl)borate, tetraphenylporphinemanganese tetrakis(pentafluorophenyl)borate, silver tetrafluoroborate, silver hexafluorophosphate, silver hexafluorophosphate, silver hexafluoroarsenate, silver perchlorate, silver trifluoroacetate and silver trifluoromethanesulfonate.

The component (b) may be used alone or in combination with at least one other.

The molar ratio of the component (A) to (B) to be used in the production process according to the present invention is preferably 1:1 to 1:1,000,000, more preferably 1:10 to 1:10000 in the case of using the component (a) as the component (B), and it is preferably 10:1 to 1:100, more preferably 2:1 to 1:10 in the case of using the component (b). There is usable as the component (B), the component (a) or (b) alone or the combination of both the components (a) and (b).

The catalyst to be used in the present invention may comprise the above-mentioned components (A) and (B) as principal components, or may comprise the components (A), (B) and an organoaluminum compound (C) as principal components. As the organoaluminum compound (C), use is made of the compound represented by the following general formula (VII):

$$R^{62}_v Al\ Q_{3-v} \qquad (V)$$

wherein $R^{62}$ is an alkyl group having 1 to 10 carbon atoms, Q is hydrogen atom, an alkoxy group having 1 to 20 carbon atoms, an aryl group having 6 to 20 carbon atoms or a halogen atom, and v is an integer of from 1 to 3.

Specific examples of the compound represented by the general formula (VII) include trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride and ethylaluminum sesquichloride.

The above-exemplified organoaluminum compound may be used alone or in combination with at least one other. The molar ratio of the foregoing component (A) to (C) to be used in the production process according to the present invention is preferably 1:1 to 1:10000, more preferably 1:5 to 1:2000, particularly preferably 1:10 to 1:1000. The use of the component (C) enables the polymerization activity to be enhanced per unit amount of the transition metal. However, an unreasonably large amount thereof unfavorably gives rise to useless organoaluminum compound and besides, leaves considerable amount thereof in the resultant polymer.

It is possible in the present invention to employ a proper carrier to support at least one of the components of the catalyst. The carrier is not specifically limited in its type, but may be selected for use from an inorganic oxide carrier, an inorganic carrier other than said oxide carrier and an organic carrier. Of these are preferable an inorganic oxide carrier and an inorganic carrier other than said oxide carrier from the viewpoint of morphological control.

Specific examples of the inorganic oxide carrier include $SiO_2$, $Al_2O_3$, $MgO$, $ZrO_2$, $TiO_2$, $Fe_2O_3$, $B_2O_3$, $CaO$, $ZnO$, $BaO$, $ThO_2$, and a mixture thereof, for instance, silica-alumina, zeolite, ferrite and glass fiber. Of these $SiO_2$ and $Al_2O_3$ are preferable. Moreover, the above-exemplified inorganic oxide carrier may contain a small amount of a carbonate, nitrate, sulfate or the like. On the other hand, carriers other than the foregoing are exemplified by magnesium compound represented by the general formula $MgR^{63}_x X^5$, typified by such magnesium compounds as $MgCl_2$ and $Mg(OC_2H_5)_2$ and complexes thereof, wherein $R^{63}$ is an alkyl group having 1 to 20 carbon atoms, an alkoxy group having 1 to 20 carbon atoms or an aryl group having 6 to 20 carbon atoms; $X^5$ is a halogen atom or an alkyl group having 1 to 20 carbon atoms; x is 0 to 2; y is 0 to 2; x+y=2; and $R^{63}$ and $X^5$ may be the same as or different from each other.

The organic carriers are exemplified by such polymers as polystyrene, styrene-divinylbenzene copolymer, polyethylene, polypropylene, substituted polystyrene and polyarylate; starch and carbon. As the carriers to be used in the present invention, there are preferably used $MgCl_2$, $MgCl (OC_2H_5)$, $Mg(OC_2H_5)_2$, $SiO_2$ and $Al_2O_3$. With regard to the properties of the carrier, which vary with the type, production process, etc., the average particle size is usually 1 to 300 micron, preferably 10 to 200 micron, more preferably 20 to 100 micron. The particle size, when being unreasonably small, leads to an increase in fine powders in the polymer, whereas the particle size, when being unreasonably large, brings about an increase in coarse powders in the polymer, thereby inducing a decrease in bulk density thereof and a cause for hopper clogging. The specific surface area of the carrier is usually 1 to 1000 m²/g, preferably 50 to 500 m²/g, and pore volume thereof is usually 0.1 to 5 cm³/g, preferably 0.3 to 3 cm³/g. When any of the specific surface area and pore volume departs from the above-mentioned scope, the catalytic activity will be deteriorated. The specific surface area and pore volume can be determined from the volume of adsorbed nitrogen gas in accordance with, for instance, BET method {refer to J. Am. Chem. Soc., 60, 309(1983)}. It is desirable that the foregoing catalyst be fired prior to use, usually at 150 to 1000° C., preferably at 200 to 800° C. In the case where at least one of the catalyst components is supported on the carrier, it is preferable that at least either of the components (A) and (B) or both the components be supported thereon. A method for supporting at least either of the components (A) and (B) is not specifically limited, but may be selected for use from ① a method in which at least either of the components (A) and (B) is mixed with the carrier; ② a method in which the carrier is treated with the organoaluminum compound or a halogen-containing silicon compound, and thereafter is mixed with the at least either of the components (A) and (B) in an inert solvent ; ③ a method in which the carrier, the component (A) and/or (B) and the organoaluminum compound or a halogen-containing silicon compound are reacted with one another; ④ a method in which the component (A) or (B) is supported on the carrier, and thereafter is mixed with the component (B) or (A); ⑤ a method in which the carrier is brought into contact with the catalytic reaction product from the components (A) and (B); and ⑥ a method in which the carrier is allowed to coexist in the catalytic reaction between the components (A) and (B); and the like methods. In addition, the organoaluminum compound as the component (C) may be added to the above-mentioned reaction system.

The catalyst obtained in the foregoing manner may be taken out as solid form by distilling away the solvent, and then used in polymerization, or may be used as such in polymerization. Moreover in the present invention, it is possible to form the catalyst by conducting the procedure of supporting at least either of the components (A) and (B) on the carrier in the polymerization reaction system. For instance, a method is available which comprising adding to the reaction system, at least either of the components (A) and (B), the carrier and, at need, the organoaluminum compound as the component (C), adding an olefin such as ethylene at atmospheric pressure to 20 kg/cm², preliminarily polymerizing the olefin at −20 to 200° C. for about 1 minute to 2 hours to form powdery catalyst.

The ratio by weight of the above-mentioned component (a) to the carrier to be used in the production process according to the present invention is preferably 1:0.5 to 1:1000, more preferably 1:1 to 1:50, while the ratio by weight of the above-mentioned component (b) to the carrier is preferably 1:5 to 1:10000, more preferably 1:10 to 1:500. In the case of mixing and using two or more species as the component (B), it is preferable that the ratio by weight of each of the component (B) to the carrier be within the foregoing range. The ratio by weight of the component (A) to the carrier is preferably 1:5 to 1:10000, more preferably 1:10 to 1:500. When the ratio by weight of the component (B) {the component (a) or (b)} to the carrier, or the ratio by weight of the component (A) to the carrier departs from the above-mentioned scope, the catalytic activity will be deteriorated.

The average particle size of the polymerization catalyst prepared in the foregoing manner is usually 2 to 200 micron, preferably 10 to 150 micron, particularly preferably 20 to 100 micron. The specific surface area of the catalyst is usually 20 to 1000 m²/g, preferably 50 to 500 m²/g. The particle size, when being smaller than 2 micron, leads to an increase in fine powders in the polymer, whereas the particle size, when being larger than 200 micron, brings about an increase in coarse powders in the polymer. The specific surface area thereof, when being less than 20 m²/g, results in deterioration in the catalytic activity, whereas the areas, when being more than 1000 m²/g, brings about a decrease in bulk density of the polymer to be produced. In the catalyst of the present invention, the amount of the transition metal is usually 0.05 to 10 g in 100 g of the carrier, preferably 0.1 to 2 g therein. When the amount of the transition metal departs from the above-mentioned scope, the catalytic activity will be deteriorated. By virtue of the catalyst supported on the carrier in the foregoing manner, an industrially advantageous production process of an ethylenic copolymer is assurable.

Examples of the α-olefins in the production process according to the present invention include α-olefins having 3 to 20 carbon atoms, specifically exemplified by propylene, 1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene and 1-eicocene. The α-olefin is used alone or in combination with at least one other. Of these, are preferable propylene, 1-butene, 1-hexene, 1-octene, 1-decene and 1-dodecene owing to easy availability and inexpensiveness, of which propylene and 1-butene are more preferable for the capability of high yield of copolymer, and 1-butene is particularly preferable.

The molar ratio of ethylene to α-olefin that are used at the time of production is preferably 0<(ethylene/α-olefin)≦1, more preferably 0<(ethylene/α-olefin)≦0.1. The copolymerization is put into practice preferably in the coexistence of ethylene and α-olefin.

The polymerization process in the present invention is not specifically limited, but may be selected for use from slurry polymerization process, gas phase polymerization process, bulk polymerization process, solution polymerization process and suspension polymerization process. Of these, slurry polymerization process and gas phase polymerization process are preferable. With regard to polymerization conditions, the polymerization temperature is usually −100 to 250° C., preferably −50 to 200° C., more preferably 0 to 130° C. The molar ratio of the starting material for reaction to catalyst that are used is preferably 1 to 108, particularly 100 to 105 expressed in terms of molar ratio of starting monomer/the component (A). The polymerization time is usually 5 minutes to 10 hours. The reaction pressure is preferably from atmospheric pressure to 200 kg/cm², particularly preferably from atmospheric pressure to 100 kg/cm². The molecular weight of the polymer can be modified by the selection of catalyst components, catalyst amount to be used and polymerization temperature, and by conducting the polymerization in the presence of hydrogen. A polymerization solvent, when used, is exemplified by aromatic hydrocarbons such as benzene, toluene, xylene and ethylbenzene, alicyclic hydrocarbons such as cyclopentane, cyclohexane and methylcyclohexane, aliphatic hydrocarbons such as pentane, hexane, heptane and octane, halogenated hydrocarbons such as chloroform and dichloromathane. The solvent may be used alone or in combination with at least one other. A monomer such as propylene may be used as a solvent. The polymerization, which depends upon its method, can be put into practice under a solventless condition.

It is possible in the present invention to carry out preliminary polymerization by the use of the above-described polymerization catalyst, for instance, by bringing a small amount of an olefin into contact with solid catalyst components. The preliminary polymerization method is not specifically limited, but can be selected for use from well-known methods. Likewise, the olefin to be used for preliminary polymerization is not specifically limited, but maybe exemplified by ethylene, α-olefins having 3 to 20 carbon atoms, a mixture thereof and the like. It is advantageous, however, to use an olefin same as that used in the substantial polymerization. The preliminary polymerization temperature is in the range of usually −20 to 200° C., preferably −10 to 130° C., more preferably 0 to 80° C. In the preliminary polymerization, there is usable as a solvent, an inert hydrocarbon, aliphatic hydrocarbon, aromatic hydrocarbon, monomer or the like, of which an aliphatic hydrocarbon is particularly preferable. The preliminary polymerization may be conducted under a solventless condition. It is preferable that the preliminary polymerization conditions be regulated so that the intrinsic viscosity[η] (as measured in decalin at 135° C.) of preliminary polymerization products is at least 0.1 deciliter/g, and the amount of the preliminary polymerization products per one mmol of the transition metal components in the catalyst is in the range of 1 to 10000 g, particularly 10 to 1000 g. By such regulation, it is enabled to efficiently produce the ethylenic copolymer according to the present invention.

The molecular weight of the polymer can be modified by adding a chain transfer agent, preferably adding hydrogen, while an inert gas such as nitrogen may be present.

3. Lubricating Oil Composition

The lubricating oil composition according to the present invention contains any one of the ethylenic copolymer as set forth in the above-mentioned {1} to {4}, and is usable as a base oil for lubricating oil or a viscosity index improver. In the case where the composition is used as a base oil for lubricating oil, the ethylenic copolymer may be contained in 100% or mixed with an other based oil.

The purpose of use of the lubricating oil composition according to the present invention is not specifically limited, but may be exemplified by internal combustion engine oil such as gasoline engine oil (two cycles, four cycles) and diesel engine oil; oil for driving or chassis such as gear oil, ATF, PSF and cushioning oil; equipment oil such as turbine oil, hydraulic oil, transmission oil, machine tool oil and refrigerating machine oil; metal working oil such as rolling oil, cutting oil, grinding oil and heat treating oil; grease and the like.

In the following, the present invention will be described in more detail with reference to working examples, which however shall never limit the present invention thereto. The physical properties of the related chemicals were evaluated by the following procedures.

(1) Sequence Distribution [EA]

The sequence distribution of the polymer was determined by the signals of methyl group, methylene group and methine group, respectively which were measured by using the solution of the polymer dissolved in deuterated chloroform through a complete proton decoupling method at 130° C. by using $^{13}$C-NMR (manufactured by Bruker Corporation under the trade name MSL 400).

The diad chain distribution [EA] that is used as an index for denoting the sequence distribution in the present invention means the fraction of linkage mode for two units of ethylene [E] and α-olefin [A] in the molecular chains of the ethylenic copolymer as determined by the nuclear magnetic resonance spectrum method ($^{13}$C-NMR method). Specifically, the [EA] denotes the fraction of ethylene/α-olefin bonds in the linkage mode for two units of ethylene and α-olefin. The decision method of peak assignment in nuclear magnetic resonance spectrum ($^{13}$C-NMR) determination was performed according to the method proposed by H. N. Cheng et al. in "Macromolecules, 24, 4813-4819 (1991)".

(2) Ethylene Content α (mol %)

The ethylene content a (mol %) was determined by the signals of methyl group, methylene group and methine group, respectively which were measured by using the solution of the polymer dissolved in deuterated chloroform through a complete proton decoupling method at 130° C. by using $^{13}$C-NMR (manufactured by Bruker Corporation under the trade name MSL 400).

(3) Number Average Molecular Weight (Mn) and Weight Average Molecular Weight (Mw)

The Mn and Mw were each determined by the use of the gel permeation chromatography instrument (manufactured by Japan Spectrometry Co.,Ltd. under the trade name GPC-880) equipped with columns (manufactured by Tosoh Corporation under the trade name "TSKGMH-6"X1 and by Hitachi, Ltd., under the trade name GL-A120X 1 and GL-A130X2, using chloroform at 23° C. as the solvent. The results are expressed in terms of polystyrene.

(4) Pour Point

The pour point was measured in accordance with JIS K 2269.

(5) Kinematic Viscosity

The kinematic viscosity was measured in accordance with JIS K 2283.

EXAMPLE 1

Used as a Base Oil (1) Synthesis of Catalyst for the Production of Olefin Polymer: (1,1'-dimethylsilylene) (2,2'-isopropylidene)bis (indenyl) zirconium dichloride ① In a three-neck flask which had been purged with nitrogen gas were placed 10.8 g of Mg (444 mmol) and 45 milliliter (mL) of THF (tetrahydrofuran), and 0.6 mL of 1,2-dibromoethane was added therein. After stirring the content for 5 minutes, the solvent was removed from the flask and 200 mL of THF was newly added therein. A solution of 18.3 g of α,α'-dichloro-o-xylene (105 mmol) dissolved in 300 mL of THF was added dropwise therein at room temperature over a period of 3 hours. Then the reaction mixture was further stirred at room temperature for 15 hours.

The resultant reaction mixture was cooled to −78° C., and 100 mL THF solution of 6.6 g (36.2 mmol) of dimethyl diethylmalonate was added dropwise to the mixture at room temperature over a period of 1 hour. After the reaction mixture was further stirred at room temperature for 2 hours, 100 mL of water was added thereto. The resultant reaction mixture was filtered with suction, the filtrate as the solvent was distilled away under reduced pressure, 1 N aqueous solution of ammonium chloride was added, and the filtered product was extracted with dichloromethane. The organic phase was washed twice each with 100 mL of water, and dried with magnesium sulfate anhydride. By distilling away the solvent, yellowish oily product was obtained. Further, the product was purified by means of column chromatography, and recrystallized from hexane to obtain 4.8 g of the compound (i) in the form of colorless crystal (yield of 44%).

Thus $^1$H-NMR of the compound (i) was determined, with the results given below.

$^1$H-NMR(CDCl$_3$) δ: 1.235(s,6H, CH$_3$), 3.002(d, J=16.4 Hz), 3.470(d, J=16.4 Hz)(8H, CH$_2$), 3.767(s, 2H, OH), 7.2–7.4(m, 8H, PhH)

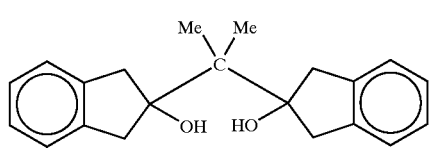

(i)

wherein Me denotes methyl group. The same applies hereinafter.

(2) 4.8 g of the compound (i) (15.9 mmol) was dissolved in 30 mL of dichloromethane, incorporated with 3.04 g (15.9 mmol) of p-toluenesulfonic acid, and heated under reflux for 8 hours. The reaction product was washed with an aqueous solution of sodium hydrogen carbonate and then with water, and thereafter dehydrated with magnesium sulfate anhydride. By distilling away the solvent under reduced pressure, yellowish oily product was obtained. Further, the product was purified by means of silica-gel column chromatography, and recrystallized from hexane to obtain 2.3 g of the compound (ii) (yield of 54%).

Thus $^1$H-NMR of the compound (ii) was determined, with the results given hereunder.

$^1$H-NMR(CDCl$_3$) δ: 1.586(s, 6H, CH$_3$), 3.470(s, 4H, CH$_2$) 3.767(s, 2H, CpH), 6.9–7.5 (m, 8H, PhH)

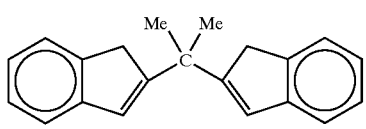

(ii)

(3) In a Schlenk flask which had been purged with nitrogen gas were placed 6.2 g (22.7 mmol) of the compound (ii) and 50 mL of diethyl ether. The reaction mixture was cooled to −78° C., and 28.4 mL (45.4 mmol) of n-butyllithium (1.60 mol/liter) was added dropwise to the mixture. After stirring at room temperature for 3 hours, the supernatant liquid was removed, and the resultant precipitate was washed twice each with 20 mL of diethyl ether. The precipitate was dried under reduced pressure to obtain a di lithium salt (iii) in the form of white powder.

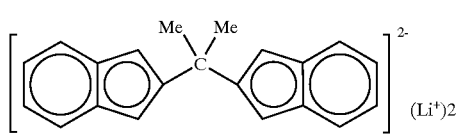

(iii)

(4) The dilithium salt (iii) was dissolved in 100 mL of THF, and to the resultant solution was added dropwise 3.0 g (22.7 mmol) of dichlorodimethylsilane at room temperature. After the reaction mixture was further stirred at room temperature for 3 hours, the solvent was distilled away and 100 mL of water was added thereto. The water phase was extracted with 200 mL of dichloromethane, and the organic phase was washed twice with water, and dehydrated with magnesium sulfate anhydride. By distilling away the solvent, and recrystallizing the resultant solid from hexane to obtain 6.5 g of the compound (iv) in the form of colorless crystal (yield of 86.5%).

Thus $^1$H-NMR of the compound (iv) was determined, with the results given hereunder.

$^1$H-NMR (CDCl$_3$) δ: −0.354(s, 6H, SiCH$_3$), 1.608(s, 6H, CCH$_3$) 3.347(s, 2H, SiCH), 6.785(s, 2H, CpH), 6.9–7.6(m, 8H, PhH)

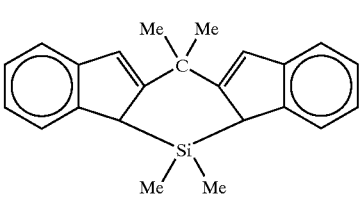

(iv)

(5) In a Schlenk flask which had been purged with nitrogen gas were placed 0.9 g (2.7 mmol) of the compound (iv) and 50 mL of hexane. The resultant solution was cooled to 0° C., and 3.4 mL (5.4 mmol) of n-butyllithium was added dropwise to the mixture. After stirring at room temperature for 3 hours, the supernatant liquid was removed, and the resultant precipitate was washed twice each with 50 mL of hexane. The precipitate was dried under reduced pressure to obtain a dilithium salt (v) in the form of pink powder.

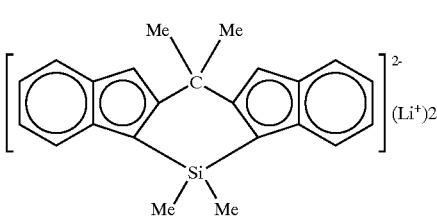

(v)

(6) To the dilithium salt (v) was added 50 mL of toluene. To the resultant suspension was added dropwise a suspension of 0.63 g (2.7 mmol) of zirconium tetrachloride suspended in 20 mL of toluene at 0° C. After stirring at room temperature for 24 hours, the resultant precipitate was filtered away and the filtrate was concentrated. The resultant concentrate was recrystallized from toluene/hexane to obtain 0.24 g of (1,1'-dimethylsilylene) (2,2'-isopropylidene)bis (indenyl)zirconium dichloride (vi) in the form of yellowish orange crystal (yield of 19%).

Thus $^1$H-NMR of the compound (vi) was determined, with the results given hereunder.

$^1$H-NMR (CDCl$_3$) δ: −0.172(s, 3H, SiCH$_3$), 0.749(s, 3H, SiCH$_3$) 1.346(s, 3H, CCH$_3$), 2.141(s, 3H, CCH$_3$), 6.692(s, 2H, CpH), 6.9–8.1(m, 8H, PhH)

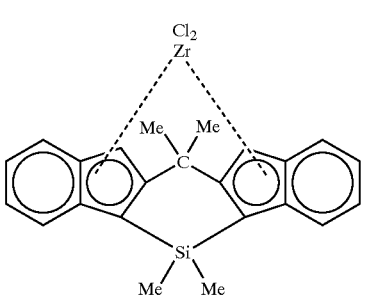

(vi)

(2) Production of Ethylenic Copolymer by Polymerization

One liter autoclave made of stainless steel and equipped with a stirrer was sufficiently dried and purged with nitrogen gas, and thereafter was charged with 200 mL of 1-octene, 20 mmol of triethylaluminum (10 mL of 2 M solution in heptane) and 5 mmol of methylaluminoxane (2.5 mL of 2.0 mmol/mL solution in heptane), and thereafter the content therein was heated to raise the temperature up to 80° C. Then the autoclave was charged with 5 micromol of (1,1'-dimethylsilylene)(2,2'-isopropylidene)bis(indenyl) zirconium dichloride (1 mL of 5 micromol/mL solution in heptane) which had been prepared in the preceding item (1). Subsequently, ethylene gas was introduced into the autoclave so as to set the pressure in the autoclave on 1.0 MPaG and start copolymerization. As the internal pressure decreased with the consumption of the ethylene gas in polymerization, ethylene gas was supplied on demand to always maintain the pressure inside the autoclave at 1.0 MPaG.

After the lapse of 30 minutes, 10 mL of methanol was placed therein to terminate the reaction. Subsequently, the content of the autoclave was taken out, the solid components were removed with filter paper 2C manufactured by Toyo Filter Paper Co., Ltd., and the components such as heptane, unreacted starting materials and methanol were distilled away by the use of a rotary evaporator under reduced pressure.

Thus, measurements and evaluations were made of the type of α-olefin, ethylene content, the fraction of ethylene/α-olefin bond [EA], whether or not the relational expression (1) is satisfied, kinematic viscosity at 100° C., viscosity index and pour point each for the ethylenic copolymer thus obtained by the above-described procedures. The results are given in Table 1.

EXAMPLE 2

Used as Base Oil

{Production of Ethylenic Copolymer by Polymerization}

One liter autoclave made of stainless steel and equipped with a stirrer was sufficiently dried and purged with nitrogen gas, and thereafter was charged with 200 mL of toluene, 200 mL of 1-octene and 5 mmol of methylaluminoxane (2.5 mL of 2.0 mmol/mL solution in heptane), and thereafter the content therein was heated to raise the temperature up to 80° C. Then hydrogen at 0.7 MPaG and ethylene gas were introduced into the autoclave so as to set the pressure inside the autoclave on 1.2 MPaG. The autoclave was charged with 5 micromol of (1,1'-dimethylsilylene)(2,2'-isopropylidene) bis(indenyl) zirconium dichloride (1 mL of 5 micromol/mL solution in heptane) which had been prepared in Example 1 (1). As the internal pressure decreased with the consumption of the ethylene gas in polymerization, ethylene gas was supplied on demand to always maintain the total pressure inside the autoclave at 1.2 MPaG.

After the lapse of 30 minutes, 10 mL of methanol was placed therein to terminate the reaction. Subsequently, the content of the autoclave was taken out, the solid components were removed with filter paper 2C manufactured by Toyo Filter Paper Co.,Ltd., and the components such as heptane, unreacted starting materials and methanol were distilled away by the use of a rotary evaporator under reduced pressure.

Thus, measurements and evaluations were made of the type of α-olefin, ethylene content, the fraction of ethylene/α-olefin bond [EA], whether or not the relational expression (1) is satisfied, kinematic viscosity at 100° C., viscosity index and pour point each for the ethylenic copolymer thus obtained by the above-described procedures. The results are given in Table 1.

EXAMPLE 3

Used as Base Oil

{Production of Ethylenic Copolymer by Polymerization}

One liter autoclave made of stainless steel and equipped with a stirrer was sufficiently dried and purged with nitrogen gas, and thereafter was charged with 200 mL of toluene, 200 mL of 1-dodecene and 5 mmol of methylaluminoxane (2.5 mL of 2.0 mmol/mL solution in heptane), and thereafter the content therein was heated to raise the temperature up to 80° C. Then the autoclave was charged with 5 micromol of (1,1'-dimethylsilylene)(2,2'-isopropylidene)bis(indenyl) zirconium dichloride (1 mL of 5 micromol/mL solution in heptane) which had been prepared in Example 1 (1). Subsequently, hydrogen at 0.7 MPaG and ethylene gas were introduced into the autoclave so as to set the pressure inside the autoclave on 1.0 MPaG and start copolymerization. As the internal pressure decreased with consumption of ethylene gas in polymerization, ethylene gas was supplied on demand to always maintain the pressure inside the autoclave at 1.0 MPaG. After the lapse of 45 minutes, 10 mL of methanol was placed therein to terminate the reaction. Subsequently, the content of the autoclave was taken out, the solid components were removed with filter paper 2C manufactured by Toyo Filter Paper Co., Ltd., and the components such as heptane, unreacted starting materials and methanol were distilled away by the use of a rotary evaporator under reduced pressure.

Thus, measurements and evaluations were made of the type of α-olefin, ethylene content, the fraction of ethylene/α-olefin bond [EA], whether or not the relational expression (1) is satisfied, kinematic viscosity at 100° C., viscosity index and pour point each for the ethylenic copolymer thus obtained by the above-described procedures. The results are given in Table 1.

COMPARATIVE EXAMPLES 1 TO 2

Measurements and evaluations were made of the type of α-olefin, ethylene content, the fraction of ethylene/α-olefin bond [EA], whether or not the relational expression (1) is satisfied, kinematic viscosity at 100° C., viscosity index and pour point each for the ethylenic copolymer obtained. The results are given in Table 1.

TABLE 1

| | Type of α-olefin | Ethylene content α (%) | [EA] fraction | Whether or not relational expression (1) is satisfied ○ or x |
|---|---|---|---|---|
| Example 1 | octene | 38 | 0.72 | ○ |
| Example 2 | octene | 49 | 0.71 | ○ |
| Example 3 | dodecene | 23 | 0.44 | ○ |
| Comparative Example 1 | propylene | 43 | 0.61 | x |
| Comparative Example 2 | butene | 55 | 0.65 | x |

| | Kinematic viscosity at 100° C. (mm²/s) | Viscosity index | Pour point (° C.) |
|---|---|---|---|
| Example 1 | 797.7 | 259 | −20.0 |
| Example 2 | 384.5 | 230 | −25.0 |
| Example 3 | 79.04 | 191 | −25.0 |
| Comparative Example 1 | 420.0 | 214 | −10.0 |
| Comparative Example 2 | 104.0 | 177 | −32.5 |

As is pointed out in Table 1, the base oil comprising the ethylenic copolymer in Comparative Examples 1 and 2 which fails to satisfy the relational expression (1) reveals high pour point for high viscosity index and low viscosity index for low pour point, whereas the base oil comprising the ethylenic copolymer which simultaneously satisfies the relational expressions (1) and (2) according to the present invention is well balanced in that the conflicting factors of high viscosity index and low pour point are reconciled by the specific ethylenic copolymer.

EXAMPLE 4

Used as Viscosity Index Improver
{Production of Ethylenic Copolymer by Polymerization}

One liter autoclave made of stainless steel and equipped with a stirrer was sufficiently dried and purged with nitrogen gas, and thereafter was charged with 200 mL of 1-butene and 10 mmol of methylaluminoxane (2.5 mL of 2.0 mmol/mL solution in heptane), and thereafter the content therein was heated to raise the temperature up to 50° C. Then the autoclave was charged with 10 micromol of (1,1'-dimethylsilylene)(2,2'-isopropylidene)bis(indenyl) zirconium dichloride (1 mL of 5 micromol/mL solution in heptane) which had been prepared in Example 1 (1), when the pressure inside the autoclave was 0.38 MPaG. Subsequently, ethylene gas was introduced into the autoclave so as to set the total pressure inside the autoclave on 0.5 MPaG and start copolymerization. As the internal pressure decreased with the consumption of the ethylene gas in polymerization, ethylene gas was supplied on demand to always maintain the pressure inside the autoclave at 0.5 MPaG. After the lapse of 30 minutes, 10 mL of methanol was placed therein to terminate the reaction. Subsequently, the content of the autoclave was taken out, the solid components were removed with filter paper 2C manufactured by Toyo Filter Paper Co., Ltd., and the components such as heptane, unreacted starting materials and methanol were distilled away by the use of a rotary evaporator under reduced pressure.

Thus, measurements and evaluations were made of the type of α-olefin, ethylene content, the fraction of ethylene/α-olefin bond [EA], whether or not the relational expression (1) is satisfied, number average molecular weight (Mn), weight average molecular weight (Mw), and Mw/Mn ratio each for the ethylenic copolymer thus obtained by the above-described procedures. The results are given in Table 2.

In addition, 3% by weight of the ethylenic copolymer thus obtained thereby as the viscosity index improver was mixed with 97% by weight of a mineral oil available on the market. Thus, measurements and evaluations were made of kinematic viscosity at 40° C. and 100° C., ratio of the viscosity of the blended oil to the viscosity of the 100% mineral oil (Comparative Example 3), viscosity index and pour point each for the resultant blended oil. The results are given in Table 3.

EXAMPLE 5

Used as Viscosity Index Improver
{Production of Ethylenic Copolymer by Polymerization}

One liter autoclave made of stainless steel and equipped with a stirrer was sufficiently dried and purged with nitrogen gas, and thereafter was charged with 200 mL of 1-octene and 5 mmol of methylaluminoxane (2.5 mL of 2.0 mmol/mL solution in heptane), and thereafter the content therein was heated to raise the temperature up to 60° C. Then the autoclave was charged with 5 micromol of (1,1'-dimethylsilylene)(2,2'-isopropylidene)bis(indenyl) zirconium dichloride (1 mL of 5 micromol/mL solution in heptane) which had been prepared in Example 1 (1). Subsequently, ethylene gas was introduced into the autoclave so as to set the total pressure inside the autoclave on 0.5 MPaG and start copolymerization. As the internal pressure decreased with the consumption of the ethylene gas in polymerization, ethylene gas was supplied on demand to always maintain the pressure inside the autoclave at 0.5 MPaG. After the lapse of 45 minutes, 10 mL of methanol was placed therein to terminate the reaction. Subsequently, the content of the autoclave was taken out, diluted with and dispersed in 300 mL of toluene. Thereafter the solid components were removed with filter paper 2C manufactured by Toyo Filter Paper Co., Ltd., and the components such as heptane, unreacted starting materials and methanol were distilled away by the use of a rotary evaporator under reduced pressure.

Thus, measurements and evaluations were made of the type of α-olefin, ethylene content, the fraction of ethylene/α-olefin bond [EA], whether or not the relational expression (1) is satisfied, number average molecular weight (Mn), weight average molecular weight (Mw), and Mw/Mn ratio each for the ethylenic copolymer thus obtained by the above-described procedures. The results are given in Table 2.

In addition, 3% by weight of the ethylenic copolymer thus obtained thereby as the viscosity index improver was mixed with 97% by weight of a mineral oil available on the market. Thus, measurements and evaluations were made of kinematic viscosity at 40° C. and 100° C., ratio of the viscosity of the blended oil to the viscosity of the 100% mineral oil (Comparative Example 3), viscosity index and pour point each for the resultant blended oil. The results are given in Table 3.

COMPARATIVE EXAMPLE 3

For 100% mineral oil available on the market, measurements and evaluations were made of kinematic viscosity at 40° C. and 100° C. and viscosity index by the above-described procedures. The ratio of the viscosity is shown as 1, since the ratio was based on the viscosity in the present Comparative Example 3. The results are given in Table 3.

TABLE 2

| | Type of α-olefin | Ethylene content α (%) | [EA] fraction | Whether or not relational expression (1) is satisfied o or x |
|---|---|---|---|---|
| Example 4 | butene | 48 | 0.76 | o |
| Example 5 | octene | 28 | 0.52 | o |

| | Number average molecular weight (Mn) | Weight average molecular weight (Mw) | Mw/Mn ratio |
|---|---|---|---|
| Example 4 | 26346 | 55068 | 2.1 |
| Example 5 | 22098 | 57692 | 2.6 |

TABLE 3

| | Mineral Oil Content (wt. %) | Viscosity index improver content (wt. %) | Kinematic viscosity (mm$^2$/s) 40° C. | Kinematic viscosity (mm$^2$/s) 100° C. | Viscosity ratio | Viscosity index |
|---|---|---|---|---|---|---|
| Example 4 | 97 | 3 | 106.7 | 16.32 | 3.533 | 165 |
| Example 5 | 97 | 3 | 82.94 | 13.35 | 2.746 | 163 |
| Comparative Example 3 | 100 | 0 | 30.2 | 5.192 | 1 | 101 |

As is pointed out in Table 3, the ethylenic copolymer according to the present invention, when added in mineral oil to be used as a viscosity index improver, markedly improves the kinematic viscosity of the blended mineral oil, increases its viscosity ratio by several times as compared with 100% mineral oil and besides, greatly improves its viscosity index.

INDUSTRIAL APPLICABILITY

As described in detail hereinabove, the ethylenic copolymer according to the present invention is imparted simultaneously with a high viscosity index and low pour point, and is usable as a useful lubricating oil composition, when used alone as base oil for a lubricating oil, or as a viscosity index improver by adding to another base oil. Moreover, the process for producing ethylenic copolymer according to the present invention enables efficient production of the ethylenic copolymer.

What is claimed is:

1. An ethylenic copolymer comprising ethylene and an α-olefin in which diad chain distribution [EA] of ethylene [E] and α-olefin [A] as determined by the nuclear magnetic resonance spectrum method ($^{13}$C-NMR method) and ethylene content (e) (mol %) as determined by nuclear magnetic resonance spectrum satisfy:

$$0.7-2.8(0.5-(e)/100)^2 - |0.25(0.5-(e)/100)| \leq [EA] \leq 2(e)/100 \quad (1)$$

$$23 < (e) \leq 49 \quad (2)$$

in which said α-olefin has 3 to 20 carbon atoms, and wherein the copolymer has a kinematic viscosity at 100° C. of 2 384.5 to 797.7 (mm$_2$/sec) and a pour point of −20 to −25° C.

2. The ethylenic copolymer according to claim 1, which has a number average molecular weight (Mn) of $10,000 < Mn \leq 200,000$ and the ratio of weight average molecular weight (Mw) to number average molecular weight (Mn) Mw/Mn $1 < Mw/Mn \leq 5$.

3. A process for producing the ethylenic copolymer as claimed in claim 1 comprising
copolymerizing ethylene and the α-olefin in the presence of a catalyst which comprises (A) at least one transition metal compound represented by following formula (I) or (II) and (B) at least one selected from the group consisting of (a) an organoaluminum oxy-compound and (b) ionic convertible into a cation:

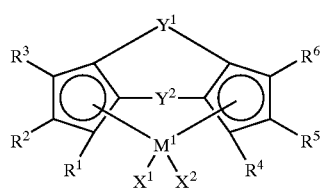

(I)

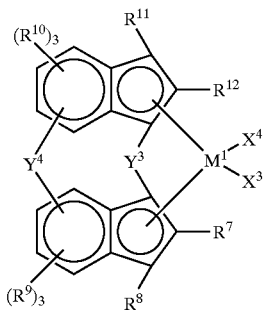

(II)

wherein $R^1$ to $R^{12}$ and $X^1$ to $X^4$ are each independently of one another, a hydrogen atom, a halogen atom, a hydrocarbon group having 1 to 20 carbon atoms, a halogen-containing hydrocarbon group having 1 to 20 carbon atoms, a silicon-containing group, an oxygen-containing group, a sulfur-containing group, a nitrogen-containing group or a phosphorus-containing group; adjacent groups may be bonded to each other to form a ring; $R^9$ and $R^{10}$ may be the same as or different from each other; $Y^1$ to $Y^4$ are each independently of each other a bivalent group bonding two ligands, and denote a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, NR$^{13}$—, PR$^{13}$—, —P(O)R$^{13}$—, —BR$^{13}$—, or —AlR$^{13}$—, wherein $R^{13}$ is a hydrogen atom, a halogen atom, a hydrocarbon group having 1 to 20 carbon atoms, a halogen-containing hydrocarbon group having 1 to 20 carbon atoms;

and $M^1$ and $M^2$ are each a transition metal belonging to at least of the group IVA, VA or VIA of the Periodic Table.

4. The process for producing the ethylenic copolymer according to claim 3, wherein the compound represented by formula (I) is a compound of a transition metal belonging to at least one of the group IVA, VA and VIA of the Periodic Table, and said compound of a transition metal is of formula (I)A or (I)B

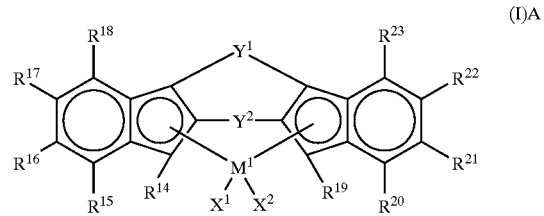

(I)A

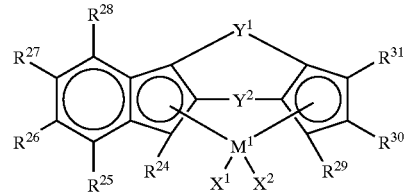

(I)B wherein $R^{14}$ to $R^{31}$ and $X^1$, $X^2$ are each independently of one another, a hydrogen atom, a halogen atom, a hydrocarbon group having 1 to 20 carbon atoms, a halogen-containing hydrocarbon group having 1 to 20 carbon atoms, a silicon-containing group, an oxygen-containing group, a sulfur-containing group, a nitrogen-containing group or a phosphorus-containing group; adjacent groups may be bonded to each other to form a ring; $Y^1$, $Y^2$ are each independently of each other a bivalent group bonding two ligands, and denote a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, NR$^{32}$—, PR$^{32}$—, —P(O)R$^{32}$—, —BR$^{32}$—, or —AlR$^{32}$— wherein R$^{32}$ is hydrogen atom, a halogen atom, a hydrocarbon group having 1 to 20 carbon atoms, a halogen-containing hydrocarbon group having 1 to 20 carbon atoms; and M$^1$ is a transition metal belonging to at least one of group IVA, VA and VIA of the Periodic Table.

5. The process for producing the ethylenic copolymer according to claim 3, wherein the compound represented by formula (I) is a compound of the transition metal belonging to at least one of group IVA, VA and VIA of the Periodic Table, and said compound of the transition metal is represented by formula (II)A or (II)B

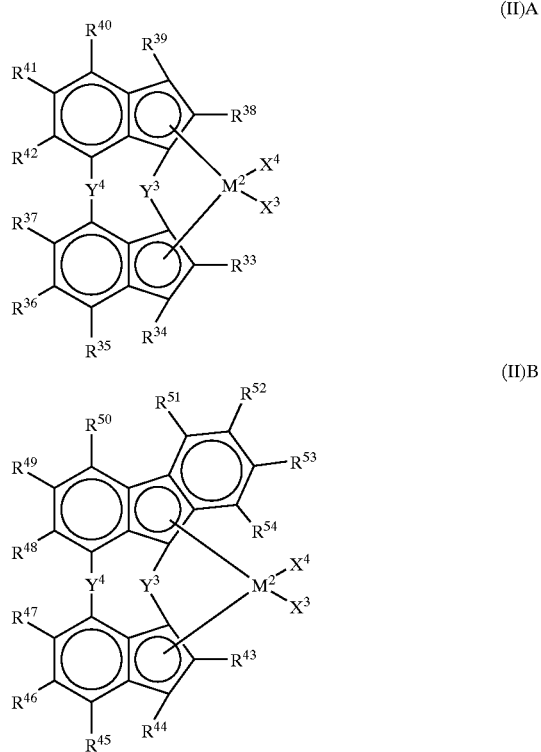

wherein R$^{33}$ to R$^{54}$ and X$^3$, X$^4$ are each independently of one another, hydrogen atom, a halogen atom, a hydrocarbon group having 1 to 20 carbon atoms, a halogen-containing hydrocarbon group having 1 to 20 carbon atoms, a silicon-containing group, an oxygen-containing group, a sulfur-containing group, a nitrogen-containing group or a phosphorus-containing group; adjacent groups may be bonded to each other to form a ring; Y', Y' are each independently of each other a bivalent group bonding two ligands, and denote a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, NR$^{55}$—, PR$^{55}$—, —P(O)R$^{55}$—, —BR$^{55}$—, or —AlR$^{55}$—, wherein R$^{55}$ hydrogen atom, a halogen atom, a hydrocarbon group having 1 to 20 carbon atoms, a halogen-containing hydrocarbon group having 1 to 20 carbon atoms; and M$^2$ is a transition metal belonging to at least one of group IVA, VA and VIA of the Periodic Table.

6. The process for producing the ethylenic copolymer according to claim 3, carried out in the presence of an (a) organoaluminum oxy-compound represented by following formula (III):

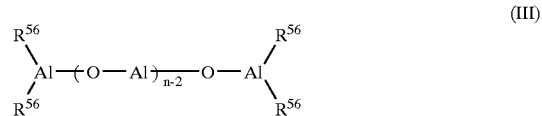

wherein R$^{56}$ is a hydrocarbon group such as an alkyl group having 1 to 20, an alkenyl group, an aryl group or an arylalkyl group or a halogen atom and may be the same as or different from one another, n is degree of polymerization and is an integer in the range of 2 to 50, or a cyclic aluminoxane represented by following formula (IV):

wherein R$^{56}$ and n are each as previously defined.

7. A lubricating oil composition which comprises the ethylenic copolymer as set forth in claim 1.

8. A lubricating oil composition wherein the ethylenic copolymer as set forth in claim 1 is contained as a base oil.

9. A lubricating oil composition wherein the ethylenic copolymer as set forth in claim 1 is contained as a viscosity index improver.

10. The ethylenic copolymer as claimed in claim 1, wherein the α-olefin has from 8 to 12 carbon atoms.

11. The ethylenic copolymer claimed in claim 1, wherein the viscosity index is from 191 to 259.

12. The process as claimed in claim 6, wherein R$_{56}$ has from 1 to 12 carbon atoms.

13. The ethylenic copolymer as claimed in claim 1, wherein the diad chain distribution fraction is from 0.44 to 0.72.

14. The ethylenic copolymer as claimed in claim 1, wherein the number average molecular weight is from 22,098 to 26,346 and the ratio Mw/Mn is from 2.1 to 2.6.

15. The process as claimed in claim 6, wherein n is from 2 to 40.

* * * * *